July 18, 1967    R. J. QUIGLEY, JR    3,331,381
FLUID BINARY COUNTER
Filed Dec. 7, 1964

INVENTOR.
RICHARD J. QUIGLEY, JR.
BY Thomas P. Murphy
AGENT

United States Patent Office 3,331,381
Patented July 18, 1967

3,331,381
FLUID BINARY COUNTER
Richard J. Quigley, Jr., Hatboro, Pa., assignor to Sperry Rand Corporation, New York, N.Y., a corporation of Delaware
Filed Dec. 7, 1964, Ser. No. 416,414
12 Claims. (Cl. 137—81.5)

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to a binary counter and more particularly to a binary counter using passive fluid elements.

The relatively recent discovery that high energy fluid streams can be controlled by means of low energy fluid streams without the aid of moving parts initiated a major research development effort in this country. Control of high energy fluid streams by low energy fluid streams implies amplification thus the term fluid amplifier was evolved for the fluid devices which performed this function. Other fluid devices were developed in rapid succession which because of their apparent similarities to well known electronic devices are called fluid oscillators, fluid multi-vibrators, fluid AND gates, fluid OR gates, etc.

The advantages of these fluid devices over the equivalent electronic elements have become well known. For example, fluid devices require no moving parts, are not subject to burn out, are easier and more economical to construct, minimize repairing and replacement and quite importantly, they are capable of operation under extreme environmental conditions such as temperature, humidity and vibratory motion.

Heretofore the main work done in the fluid field involved the development of active fluid elements, i.e., fluid elements with a memory. These elements utilize the well known boundary layer or lock-on effect to achieve memory and stability. For example, a conventional fluid flip-flop comprises a single fluid element having two outlet channels, an input channel and two control channels. When a power stream of fluid enters the fluid flip-flop, it goes into one or the other of the output channels and there adheres to the wall of that particular channel with sufficient force so that the power stream becomes stable in that channel. In order to switch the power stream from one channel to the other a control fluid of sufficient magnitude to overcome this adhering force must be applied to the power stream. Thus, it may be seen that while the gain of these active fluid elements may be relatively high, the switching time involved in moving the power stream from one output channel to the other is impeded and slowed down by the lock-on effect.

Heretofore, fluid logical devices such as the fluid flip-flop just discussed employed active fluid elements because the lock-on feature provided the stability or memory which was needed. However, the above-mentioned disadvantage of slow switching time limits the utility of these active fluid elements.

In the search for fluid elements with faster switching times it became apparent that if logical fluid elements which did not incorporate the boundary layer or lock-on effect could be developed, the disadvantage of slow switching time could be overcome because the switching of a power stream from one output channel to the other would not be slowed down by the necessity of overcoming the boundary layer force. Thus, attention was directed toward development of passive fluid elements, i.e., fluid elements without memory which while lacking inherent stability can be used in logical circuitry even where memory was required.

Aside from slow switching time associated with the active elements, the active fluid elements also have the disadvantage of being extremely sensitive to fluid element geometry. Thus, the dimensions of an active fluid element are critical. This obviously adds to the cost and difficulty of fabrication of these elements.

Thus, attention was also directed toward finding the fluid elements which are relatively insensitive to element geometry.

The present invention contemplates a fluid logical element wherein the disadvantages of slow switching time and geometry sensitivity are overcome.

The present invention contemplates a binary counter using only passive fluid elements. The binary counter of the present invention comprises a unique fluid flip-flop in combination with a multi-state passive element as one stage of the counter. The fluid flip-flop which comprises part of the binary counter of the present invention is made up of two passive elements. One element is a two input inverter or NOR gate and the other element is a two input-three output passive element. While neither of these elements is active, i.e., has a memory, they are combined in such a way to provide a fluid element with a memory. Therefore, the fluid flip-flop of the present invention has a faster switching time than presently available flip-flops and because it is substantially completely insensitive to element geometry, it is easier and cheaper to make.

Therefore, it is an object of the present invention to provide a fluid binary counter which is substantially faster in operation than fluid binary counters heretofore available.

It is another object of the present invention to provide a fluid binary counter which is substantially less sensitive to geometric configurations than fluid binary counters heretofore available.

A further object of the present invention is to provide a fluid binary counter utilizing entirely passive fluid elements which is easier and more economical to fabricate than presently available fluid binary counters.

Yet another object of the present invention is to provide a fluid binary counter which is faster in operation and simpler and more economical to construct than fluid binary counters heretofore available.

Yet another object of the present invention is to provide a fluid flip-flop comprising passive fluid elements which nevertheless has memory capabilities necessary in such a flip-flop.

Another object of the present invention is to provide a fluid flip-flop circuit which has a substantially faster switching time than previously available flip-flops.

A still further object of the present invention is to provide a fluid flip-flop which is faster in operation and simpler and more economical to construct than previously available fluid flip-flops.

Other objects and many of the attendant advantages of the present invention will become more apparent with the reading of the following description in connection with the accompanying drawings wherein like reference numerals are used to indicate like parts thereof and wherein.

Figure 1:
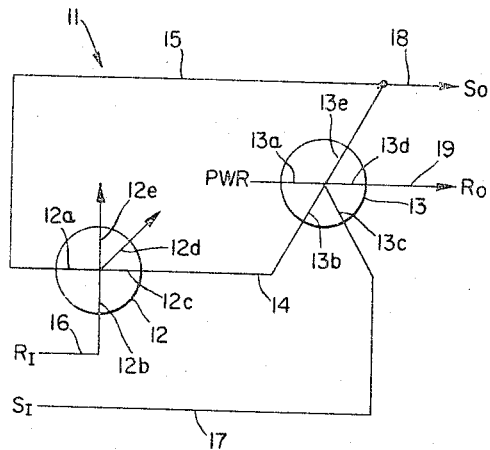
FIGURE 1 illustrates in schematic form a preferred embodiment of the fluid flip-flop of the present invention.

Referring now more particularly to FIGURE 1 there is shown fluid flip-flop 11 of the present invention. The fluid flip-flop 11 comprises a two input-three output fluid element 12 and a NOR element 13. The two input-three output fluid element hereinafter referred to as the 2–3 element 12 comprises two input channels 12a and 12b and three output channels, 12c, 12d and 12e. The output channel 12c is disposed in alignment with the input channel 12a while the output channel 12e is disposed in alignment with the input channel 12b. Thus, an input on the input channel 12b normally passes out through the output channel 12e and an input applied to the input channel 12a normally passes out through the output channel 12c. However, the output channel 12d is disposed equidistantly between the output channels 12e and 12c such that when input signals are applied simultaneously to the input channels 12a and 12b the output channel 12d will have an output at which time neither of the output channels 12e or 12c will have an output.

The NOR element or circuit 13 comprises an input channel 13a normally continuously connected to a source of power fluid (not shown). An output channel 13d is disposed in alignment with the input channel 13a such that normally the power stream passes out through the output channel 13d. The NOR circuit 13 is provided with another output channel 13e and two control channels 13c and 13b substantially as shown in the drawing. Thus, the NOR circuit 13 normally has an output at the output channel 13d. However, when an input signal is provided at either of the control channels 13b or 13c, the power stream is deflected to the output channel 13e for the duration of the signal. When the signal terminates, the power stream automatically reverts to the output channel 13d.

A conduit 14 connects the output channel 12c of the 2–3 element 12 to the control channel 13b of the NOR circuit 13. A conduit 15 connects the output channel 13e of the NOR circuit 13 to the input channel 12a of the 2–3 element 12. The flip-flop 11 has an input channel 16 connected to the input channel 12b of the 2–3 element. An input channel 17 is connected to the control channel 13c of the NOR circuit 13. The flip-flop 11 has an output channel 18 which is connected to the output channel 13e of the NOR circuit and an output channel 19 which is connected to the output channel 13d of the NOR circuit 13.

In operation the flip-flop 11 is normally in the reset condition, i.e., the power stream is emerging through the output channel 19. In this condition neither the reset input channel 16 nor the set input channel 17 has an input signal. To set the flip-flop 11 a pulse is applied to the input channel 17 which causes the power stream to be deflected to the output channel 13e of the NOR circuit 13. When this occurs, part of the power stream is fed to the input channel 12a of the 2–3 element 12 via the conduit 15 and thence to the input channel 13b of the NOR circuit 13 through the conduit 14. This causes the fluid power stream to be held in the output channel 13e even after the pulse of the input channel 17 ceases. In this condition the output channel 18 has an output and the flip-flop 11 is in the set state. To reset the flip-flop a fluid pulse is applied to the input channel 16. When this occurs, the input channels 12b and 12a of the 2–3 element 12 each have an input and, therefore, the power stream entering the 2–3 element 12 at the input channel 12a is diverted through the output channel 12d. When this occurs, the input to the NOR circuit 13 via the control channel 13b is removed and the power stream reverts to the output channel 19.

Figure 2:
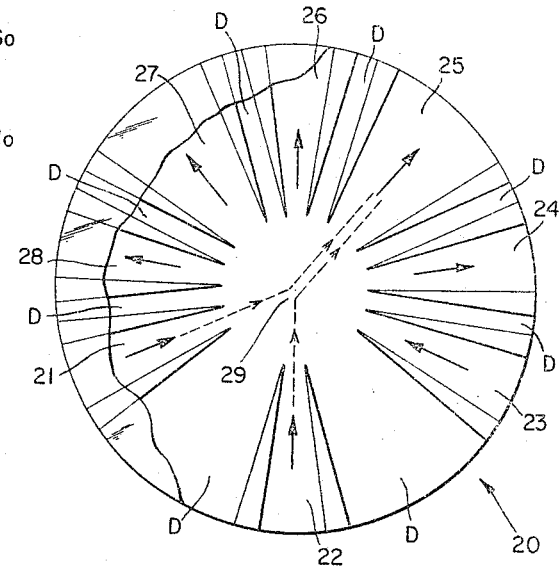
FIGURE 2 illustrates in a schematic form a passive element used in the binary counter of the present invention.

FIGURE 2 illustrates a five state fluid logic element or a three input-five output passive fluid element 20 hereinafter referred to as the 3–5 element 20. The particular mode of fabrication of the 3–5 element 20 forms no parts of this invention. The 3–5 element 20 may be fabricated in any convenient manner, e.g., the various input and output channels and passageways may be cut, machined or molded from a first sheet of plastic which is covered over by a second sheet of plastic fixedly secured to the first sheet of plastic.

The 3–5 element 20 comprises three input channels 21, 22 and 23 which lead into and are symmetrically and angularly disposed about an interaction chamber 29. Five output channels 24 through 28 lead from the interaction chamber 29. The output channels 24 through 28 are symmetrically and angularly disposed about the interaction chamber 29. The output channel 26 is disposed in direct alignment with the input channel 22; the output channel 28 is disposed in direct alignment with the input channel 23; the output channel 24 is disposed in direct alignment with the input channel 21.

The output channel 25 is so disposed relative to the input channels 21 and 22 that a line coincident with the axis of the output channel 25 bisects the angle formed by the intersection of the lines coincident with the axes of the input channels 21 and 22. The output channel 27 is so disposed relative to the input channels 22 and 23 that a line coincident with the axis of the output channel 27 bisects the angle formed by the intersection of the lines coincident with the axes of the input channels 22 and 23. Passageways D which are disposed between adjacent input and output channels cause the interaction chamber 29 to communicate with an area external of the 3–5 element 20, e.g., the atmosphere. The openings of the output channels 25 and 27 which communicate with the interaction chamber 29 are larger (up to 2 times as large) than the openings of the remaining input and output channels which are equal.

When the input channel 21 has an input, the output channel 24 has an output. When the input channel 23 has an input, the output channel 28 has an output. When the input channel 22 has an input, the output channel 26 has an output. Since there are three combinations of inputs to the input channels 21, 22 and 23 which provide an output at the output channel 26, the outputs at channel 26 are ambiguous. For purposes of this invention the output channel 26 is not used.

When inputs of equal magnitude are simultaneously applied to the input channels 22 and 23, the power streams therefrom interact and combine within the interaction chamber 29 to provide a resultant output at the output channel 27. Similarly, when the input channels 21 and 22 have simultaneous inputs of equal magnitude, the output channel 25 has an output. The larger opening of the output channels 25 and 27 are to accommodate this combination of two inputs. The various passageways D permit excess air due to the inputs to be discharged without affecting the output pressure levels.

The 3–5 element 20 is a true passive element in that there is no lock-on or boundary layer effect in any one of the output channels. Furthermore, it should be noticed that since the 3–5 element of FIGURE 2 is a passive fluid element, it is therefore faster switching than conventional active fluid elements. The 3–5 element 20 is also substantially insensitive to geometric variations within its structure. By virtue of its unique arrangement the 3–5 element 20 performs in one logical element the logical functions of eight passive AND gates. Thus, the number of logical functions which can be performed within the jet interaction chamber 29 substantially reduces the number of levels of logic and the attendant associated structure in a given fluid logic system.

Figure 3:
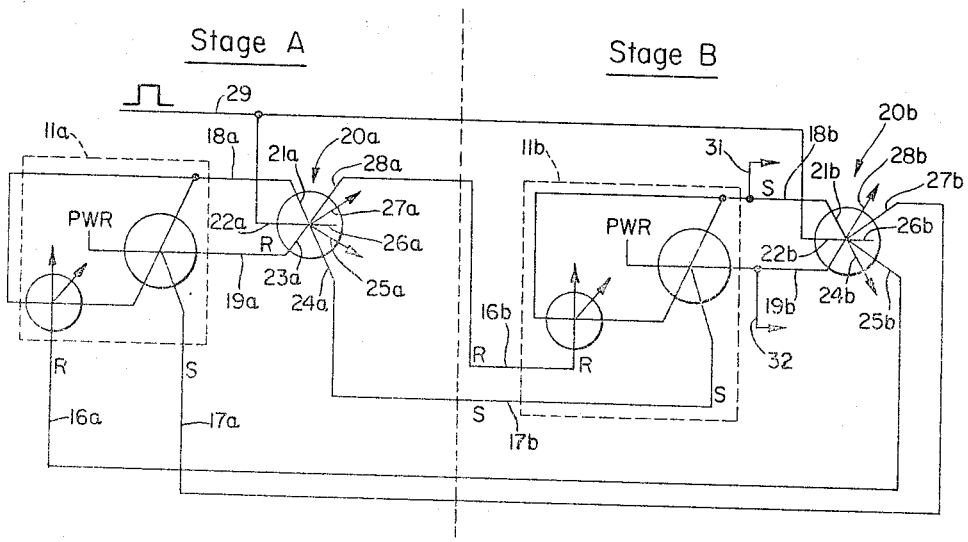
FIGURE 3 illustrates in schematic form a preferred embodiment of the fluid binary counter of the present invention.

FIGURE 3 illustrates the binary counter of the present invention. The binary counter of FIGURE 3 employs two fluid flip-flops identical to the fluid flip-flops 11 described in connection with FIGURE 1 and two 3–5 elements (shown in schematic) which are identical in construction with the 3–5 element 20 described in connection with FIGURE 2. Since the binary counter employs fluid flip-flops and a 3–5 element identical to fluid flip-flops 11 and the 3–5 element 20 like reference numerals are used to indicate like parts. In order to differentiate between the fluid flip-flop 11 and the 3–5 element 20 as used in the stages A and B of the binary counter of FIGURE 3 the suffix *a* is used to indicate the parts associated with stage A while the suffix *b* is used to indicate the parts associated with the stage B.

Stage A of the binary counter of FIGURE 3 comprises fluid flip-flop 11a and the 3–5 element 20a. The output channel 18a of the fluid flip-flop 11a is connected to the input channel 21a of the 3–5 element 20a while the output channel 19a of the fluid flip-flops 11a is connected to the input channel 23a of the 3–5 element 20a.

Stage B of the fluid binary counter of FIGURE 3 comprises fluid flip-flop 11b and the 3–5 element 20b. The output channel 18b of the fluid flip-flop 11b is connected to the input channel 21b of the 3–5 element 20b. The output channel 19b of the fluid flip-flop 11b is connected to the input channel 23b of the fluid 3–5 element 20b.

The output channels 25a, 26a and 27a of the 3–5 element 20a are connected directly to a low pressure dump, e.g., the atmosphere. The output channels 24b, 26b and 28b of the 3–5 element 20b are also connected to a low pressure dump.

Stages A and B of the fluid binary counter of FIGURE 3 are interconnected in the following manner: the output channel 28a of the 3–5 element 20a is connected to the input channel 16b of the fluid flip-flop 11b while the output channel 24a of the 3–5 element 20a is connected to the input channel 17b of the fluid flip-flop 11b. The output channel 27b of the 3–5 element 20b is connected to the input channel 17a of the fluid flip-flop 11a while the output channel 25b of the 3–5 element 20b is connected to the input channel 16a of the fluid flip-flop 11a.

The input channels 22a and 22b of the 3–5 elements 20a and 20b, respectively, are connected in common to the fluid conductor 29. The fluid conductor 20 is adapted to be connected to a source of fluid toggle pulses (not shown). The binary output of the counter is taken from output channels 31 and 32 which are connected to output channels 18b and 19b, respectively.

The binary counter of FIGURE 3 operates in the following manner: In the initial condition, i.e., before a toggle pulse is applied to fluid conductor 29 the 3–5 element 20a is coupled to the flip-flop 11b and provides an input to the input channel 16b of the flip-flop 11b via the output channel 28a of the 3–5 element 20a. The output channels 19a and 19b of the flip-flops 11a and 11b, respectively, each has an output. The 3–5 element 20b is isolated from the flip-flop 11a because neither of the output channels 25b or 27b has an output.

When the first fluid toggle pulse is applied to fluid conductor 29 the output of the 3–5 element 20a is changed from the output channel 28a to the output channel 27a causing the input channel 16b of the flip-flop 11b to lose its input. The 3–5 element 20a is isolated from the fluid flip-flop 11b for the duration of the first toggle pulse. The first toggle pulse which is also applied to the input channel 22b causes the output in the output channel 28b of the 3–5 element 20b to change to the output channel 27b. Therefore, the input channel 17a of the flip-flop 11a has an input. This causes the output in the output channel 19a of the flip-flop 11a to switch to the output channel 18a of the flip-flop 11a where it remains even after the input to 17a terminates when the first toggle terminates.

When the first toggle pulse terminates, the output channel 24a of the 3–5 element 20a receives an output and therefore the input channel 17b of the flip-flop 11b has an input. The input channel 17a of the flip-flop 11a loses its input because the output in the output channel 27b is switched to the output channel 24b since the output in the output channel 18b of the flip-flop 11b is the only input to the 3–5 element 20b. The output channel 18b of the flip-flop 11b has an output since the input channel 17b has an input.

On application of the second toggle pulse to the fluid conductor 29 the input channel 17b of the flip-flop 11b loses its input because the output in the output channel 24a of the 3–5 element 20a is switched to the output channel 25a. At the same time the output in the output channel 24b is switched to the output channel 25b of the 3–5 element 20b thereby providing the input channel 16a of the flip-flop 11a with an input. This causes the output in the output channel 18a to switch to the output channel 19a of the flip-flop 11a.

When the second toggle pulse terminates, the output channel 28a has an output because the only input provided the 3–5 element 20a is at the input channel 23a via the output channel 19a of the flip-flop 11a. Since the output channel 28a of the 3–5 element 20a now has an output, the input channel 16b of the flip-flop 11b has an input and this causes the output in the output channel 18b to switch to the output channel 19b and the binary counter is in its initial condition and has completed one cycle.

Thus, as in any conventional binary counter the application of two toggle pulses are required to cause the binary counter of the present invention to go through one counting cycle. Stated another way, every other pulse causes the flip-flop 11b to reassume its initial or reset condition.

The embodiments of the invention in which an exclusive property or privilege is claimed are defined as follows:

1. A fluid flip-flop, comprising in combination: a fluid amplifier having first and second output channels and an input channel in alignment with said first output channel, means connected to said input channel normally directing a fluid power stream through said first output channel, control channel means connected to said fluid amplifier for deflecting said power stream through said second output channel in response to a fluid signal being applied to said control channel, feedback means connecting the said second output channel to said control channel, said feedback means comprising a fluid switching device having a first input channel and a first output channel for receiving the fluid from said first input channel, the first input and output channels of said switching device being connected in series with said feedback means whereby when a fluid signal is applied to said control channel the said power stream is deflected to said second output channel and is maintained in said second channel by said feedback means, and a second input channel connected to said fluid switching device operative when a fluid signal is applied thereto to deflect the fluid from the first input channel of the switching device away from the first output channel thereof.

2. In a fluid flip-flop, a fluid amplifier having first and second output channels, an input channel in alignment with said first output channel, at least one control channel connected on one side of said fluid amplifier, first means connected to said input channel normally directing a fluid power stream through said first output channel, feedback means connected between said second output channel and said control channel normally directing said power stream into said control channel when said power stream is in said second output channel, fluid switch means connected to said feedback means for selectively disconnecting said power stream from said first control channel to thereby cause said power stream to automatically switch to said first output channel.

3. A binary counter, comprising in combination: first and second flip-flops, each having set and reset input terminals and set and reset output terminals, first means connecting the set and reset output terminals of said first flip-flop to the set and reset input terminals of said second flip-flop, respectively, second means responsive to a toggle pulse to connect the set and reset output terminals of said second flip-flop to the reset and set input terminals of said first flip-flop, respectively, said first means being responsive to said toggle pulse to disconnect the set and reset output terminals of said first flip-flop to the set and reset input terminals of said second flip-flop.

4. A binary counter according to claim 3, wherein each of said first and second flip-flops include a logical element having a stable state and an unstable state, means for providing a signal to said logical element to switch said logical element from said stable state to said unstable state, means responsive to said signal to maintain said logical element in said unstable state after termination of said signal.

5. A binary counter, comprising in combination: a first fluid flip-flop, a second fluid flip-flop, each of said flip-flops having set and reset input terminals and set and reset output terminals, first means coupling said first flip-flop to said second flip-flop providing an input signal to the reset input terminal or the set input terminal of said second flip-flop, respectively, when the reset output terminal or the set output terminal of said first flip-flop has an output signal, second means coupling said second flip-flop to said first flip-flop responsive to a toggle pulse to provide an input signal, for the duration of said toggle pulse, to the reset input terminal or the set input terminal of said first flip-flop, respectively, when the set output terminal or the reset output terminal of said second flip-flop has an output signal, said first means responsive to said toggle pulse to isolate any signal on the reset or set output terminals of said first flip-flop from said second flip-flop for the duration of said toggle pulse.

6. A binary counter according to claim 5 wherein each of said flip-flops include, a fluid amplifier having first and second output channels and an input channel in alignment with said first output channel, means connected to said input channel normally directing a fluid power stream through said first output channel, means connected to said fluid amplifier for providing a fluid signal to deflect said power stream through said second output channel, means connected to said fluid amplifier responsive to said fluid signal to maintain said power stream deflected after said fluid signal terminates.

7. A binary counter according to claim 5 wherein said first and second means each comprise; first, second third input channels, a first output channel disposed in alignment with said first input channel to receive fluid only when said first input channel alone has an input, a second output channel disposed in alignment with said second input channel to receive fluid only when said second input channel alone has an input, a third output channel disposed to receive fluid only when said first and third input channels each have an input, a fourth output channel disposed to receive fluid only when said second and third input channels each have an input.

8. A binary counter according to claim 7 wherein each of said flip-flops include, a fluid amplifier having first and second output channels and an input channel in alignment with said first output channel, means connected to said input channel normally directing a fluid power stream through said first output channel, means connected to said fluid amplifier for providing a fluid signal to deflect said power stream through said second output channel, means connected to said fluid amplifier responsive to said fluid signal to maintain said power stream deflected after said fluid signal terminates.

9. A fluid binary counter, comprising in combination: a first fluid flip-flop having set and reset output channels and set and reset input channels, a second fluid flip-flop having set and reset output channels and set and reset input channels, first passive fluid means coupling said first flip-flop to said second flip-flop providing an input fluid signal to said reset input channel or said set input channel of said second flip-flop, respectively, when said reset output channel or said set output channel of said first flip-flop has an output signal, second passive fluid means coupling said second flip-flop to said first flip-flop responsive to a fluid toggle pulse to provide an input fluid signal for the duration of said fluid toggle pulse to said reset input channel or said set input channel of said first flip-flop, respectively, when said set output channel or said reset output channel of said second flip-flop has an output, said first passive fluid means responsive to said fluid toggle pulse to isolate for the duration of said fluid toggle pulse any fluid signal on said reset or set output terminals of said first flip-flop from said second flip-flop.

10. A fluid binary counter according to claim 9 wherein each of said fluid flip-flops include, a fluid amplifier having first and second output channels and an input channel in alignment with said first output channel, means connected to said input channel normally directing a fluid power stream through said first output channel, means connected to said fluid amplifier for providing a fluid signal to deflect said power stream through said second output channel, means connected to said fluid amplifier responsive to said fluid signal to maintain said power stream deflected after said fluid signal terminates.

11. A fluid binary counter according to claim 9 wherein said first and second passive fluid means each comprise; first, second and third input channels, a first output channel disposed in alignment with said first input channel to receive fluid only when said first input channel alone has an input, a second output channel disposed in alignment with said second input channel to receive fluid only when said second input channel alone has an input, a third output channel disposed to receive fluid only when said first and third input channels each have an input, a fourth output channel disposed to receive fluid only when said second and third input channels each have an input.

12. A fluid binary counter according to claim 11 wherein each of said fluid flip-flops include, a fluid amplifier having first and second output channels and an input channel in alignment with said first output channel, means connected to said input channel normally directing a fluid power stream through said first output channel, means connected to said fluid amplifier for providing a fluid signal to deflect said power stream through said second output channel, means connected to said fluid amplifier responsive to said fluid signal to maintain said power stream deflected after said fluid signal terminates.

References Cited

UNITED STATES PATENTS

| | | | |
|---|---|---|---|
| 3,185,166 | 5/1965 | Horton et al. | 137—81.5 |
| 3,226,023 | 12/1965 | Horton | 235—201 |
| 3,227,368 | 1/1966 | Jacoby | 235—201 |
| 3,240,219 | 3/1966 | Dexter et al. | 137—81.5 |
| 3,240,220 | 3/1966 | Jones | 137—81.5 |
| 3,243,113 | 3/1966 | Welsh | 235—201 |
| 3,246,661 | 4/1966 | Bauer | 137—81.5 |
| 3,248,053 | 4/1966 | Phillips | 137—81.5 |

OTHER REFERENCES

I.B.M. Technical Disclosure Bulletin, Fluid Binary Counter, A. E. Mitchell, vol. 6, No. 2, July 1963, page 30.

M. CARY NELSON, *Primary Examiner.*

S. SCOTT, *Assistant Examiner.*